Sept. 16, 1930.  F. TURRETTINI  1,775,952
MEASURING DEVICE IN CONNECTION WITH BORING MACHINES
Filed April 20, 1927
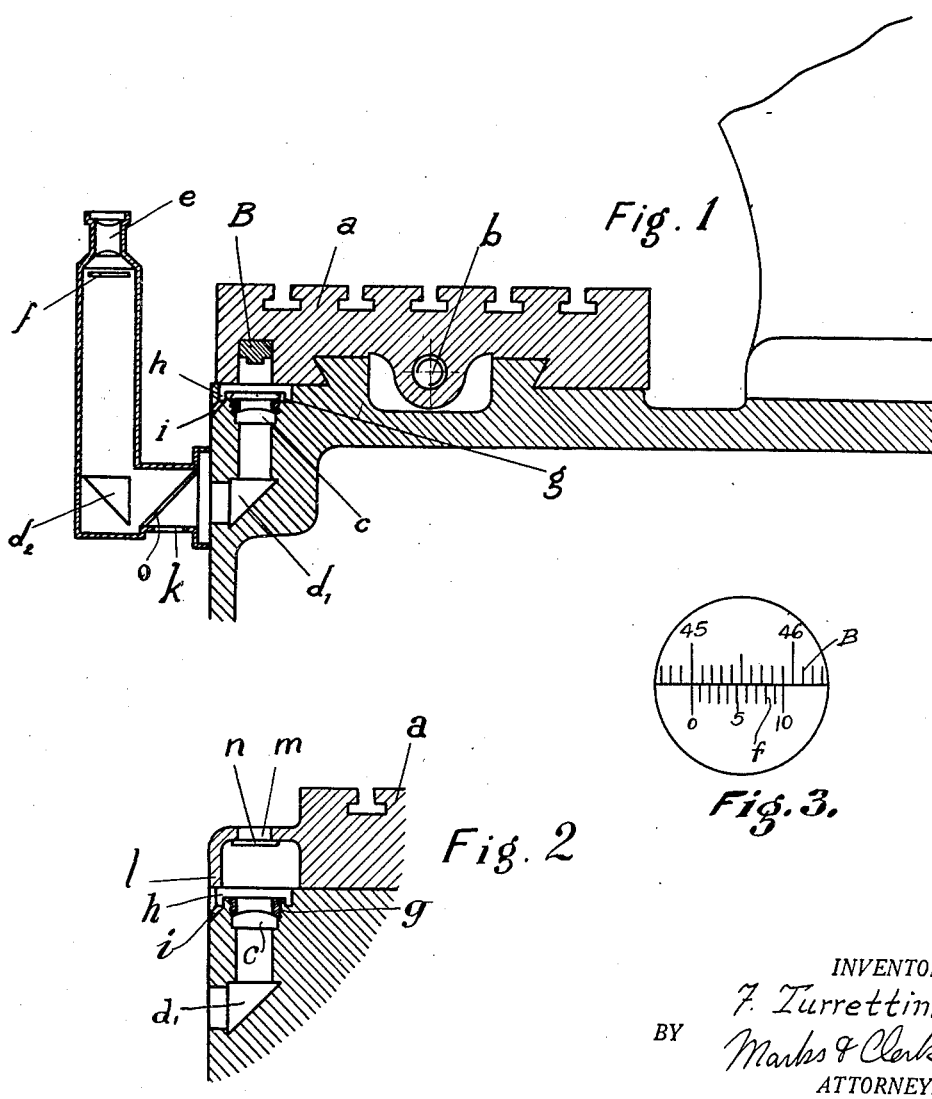
INVENTOR.
F. Turrettini
BY Marks & Clerk
ATTORNEYS.

Patented Sept. 16, 1930

1,775,952

UNITED STATES PATENT OFFICE

FERNAND TURRETTINI, OF GENEVA, SWITZERLAND

MEASURING DEVICE IN CONNECTION WITH BORING MACHINES

Application filed April 20, 1927. Serial No. 185,275.

Should a boring machine be used for boring accurately located holes, the slides bearing either the boring head or the work table, must be accurately set in position in order to ensure that the boring tool performs the work at the required place.

For that purpose, boring machines may have either measuring devices including the screw itself for the motion of the table or measuring devices for the setting in position of the slides by means of accurate end measuring gauges to be inserted between a movable and a stationary anvil.

The subject of the present invention is another measuring device including the use of an accurately divided scale secured to one part of the slide carriage (movable or not movable part) and a reading microscope secured to the other part of the slide carriage (movable or not movable), the scale being preferably secured to the machine in such a way that no risk of soiling its divided surface by dirt, dust or lubricant might occur.

Boring machines have, generally speaking, two carriages working square one to the other in the form of two separate slide carriages the one in direct connection with the work table, the other in direct connection with the boring head.

Other machines involve superposed cross slides bearing either the boring head or the work table.

The principle explained below can be applied to any design of boring machine.

The accompanying drawings show the slide of a boring machine arranged with such an optical measuring device.

Fig. 1 is a sectional part view of the table of a boring machine provided with the measuring device.

Fig. 2 is another sectional part view of the table showing a somewhat modified arrangement of the measuring device.

Fig. 3 shows the field of view of a microscope connected with the table.

The boring head and the other part of the boring machine having no direct connection with the subject of the present invention are not shown on the drawings.

$a$ is the movable part of a slide carriage, movable on a stationary part of the machine by means of the setting screw $b$. The slide carriage $a$ is guided by means of dove-tailed or otherwise shaped ways. The scale B is located in a recess provided in the carriage $a$ so that the divided face of the scale is set downwards in order to prevent the deposit of dust or dirt on that surface. The reading microscope is partially built underneath the stationary slide part and is composed of an object-lens $c$, one or several reflecting prisms or mirrors $d^1$ $d^2$ and an eye-piece $e$ reading a vernier scale $f$ or a micrometer of the well known type. Fig. 3 shows the scale B and the vernier scale $f$ as seen through the eye-piece $e$. For preventing dust or lubricant to soil the objective $c$, the same is surrounded by a projecting rim $g$. A groove $h$ and a hole $i$ can be provided for collecting and draining off lubricant flowing around the rim $g$.

According to Fig. 1, the field of the microscope is illuminated by the transparent glass $o$ located in front of the aperture $k$; part of the light admitted through this aperture is, as a matter of fact, reflected from the said transparent glass on the scale B.

According to Fig. 2, the table is provided with a prolongation $l$ showing a longitudinal groove $m$. $n$ refers to a rule of transparent material stopping the bottom of the groove $m$ and carrying the graduation on its inner face. The different parts of the optical system are arranged in the same way as shown in Fig. 1.

I claim:

1. In a machine tool comprising a stationary part and a movable part adapted to slide along said stationary part, one of said parts having an under surface in sliding contact with an upper surface of the other part, said under surface of one of the parts being provided with a channel extending in the direction of displacement of the movable part, said other part being provided with a passage extending from a point of said upper surface beneath the channel to an outside face of said part, a scale secured to the bottom of said channel, and an optical system carried by said other part and arranged in alignment with said passage to permit observation of said scale through the passage.

2. In a machine tool comprising a stationary part and a movable part adapted to slide along said stationary part, one of said parts having an under surface in sliding contact with an upper surface of the other part, said under surface of one of the parts being provided with a channel extending in the direction of displacement of the movable part, said other part being provided with a passage extending from a point of said upper surface beneath the channel to an outside face of said part, a scale secured to the bottom of said channel, an optical system carried by said other part and arranged in alignment with said passage to permit observation of said scale through the passage, said optical system comprising an objective lens placed within the passage, and means surrounding the lens for preventing deposit of lubricant thereon.

3. In a machine tool comprising a stationary part and a movable part adapted to slide along said stationary part, said movable part having an under surface in sliding contact with an upper surface of the stationary part, said under surface of the movable part being provided with a channel extending in the direction of displacement of the movable part, said stationary part being provided with a passage extending from a point on said upper surface beneath the channel to an outside face of said stationary part, a scale secured to the bottom of said channel, and an optical system carried by the stationary part and arranged in alignment with said passage to permit observation of said scale through the passage.

4. In a machine tool comprising a stationary part and a movable part adapted to slide along said stationary part, said movable part having an under surface in sliding contact with an upper surface of the stationary part, said under surface of the movable part being provided with a channel extending in the direction of displacement of the movable part, said stationary part being provided with a passage extending from a point on said upper surface beneath the channel to an outside face of said stationary part, a scale secured to the bottom of said channel, an optical system carried by the stationary part and arranged in alignment with said passage to permit observation of said scale through the passage, said optical system comprising an objective lens placed within the passage, a projecting rim surrounding the lens, a groove provided around the rim, and means for establishing communication between said groove and an outer wall of the stationary part.

In testimony whereof I affix my signature.

FERNAND TURRETTINI.